A. S. NEWMAN.
MEANS FOR JOINING THE ENDS OF CINEMATOGRAPH FILMS.
APPLICATION FILED JULY 6, 1920.

1,383,745. Patented July 5, 1921.

Arthur Samuel Newman, Inventor
By Knight Bros, Attorneys

UNITED STATES PATENT OFFICE.

ARTHUR SAMUEL NEWMAN, OF HIGHGATE, LONDON, ENGLAND, ASSIGNOR OF ONE-THIRD TO THOMAS HORACE BOLAM AND ONE-THIRD TO SIDNEY NORMAN BARNARD, BOTH OF LONDON, ENGLAND.

MEANS FOR JOINING THE ENDS OF CINEMATOGRAPH-FILMS.

1,383,745.     Specification of Letters Patent.     Patented July 5, 1921.

Application filed July 6, 1920. Serial No. 394,288.

(GRANTED UNDER THE PROVISIONS OF THE ACT OF MARCH 3, 1921, 41 STAT. L., 1313.)

*To all whom it may concern:*

Be it known that I, ARTHUR SAMUEL NEWMAN, a subject of the King of Great Britain, residing at 25 Hornsey Lane, Highgate, London, England, have invented new and useful Improvements in Means for Joining the Ends of Cinematograph-Films, for which I have filed an application in Great Britain on Feb. 3, 1914, Patent No. 2794, of 1914, of which the following is a full, clear, and exact description.

The invention relates to that kind of broad cinematograph film which is made into an endless form by joining the ends and on which the pictures are arranged in parallel rows or in spiral form.

Heretofore great difficulty has been experienced in connecting the ends of such broad films as the use of acetone or amyl-acetate or other like cements or solvents, causes the celluloid to shrink or buckle to an undesirable extent.

When a double thickness of broad film is buckled, it will not readily pass through the gate of the apparatus for projecting the pictures, the ends of the film cannot be disconnected without destroying part of the film and such films cannot be readily stored or sent by post. Some adhesive plasters have been employed for temporarily connecting the ends of a broad film or films, but such plasters render the film opaque at that part, and prevent the smooth running of the film through the gate of the apparatus. Such plasters are also liable to let the ends of the film slip, thus spoiling the register of the pictures.

The object of the present invention is to provide simple means for connecting and disconnecting the ends of such a broad cinematograph film. The principal object of the invention is to enable a short and comparatively broad film on which the pictures are arranged in rows or spirally to be made into a continuous film for use in that type of cinematograph apparatus intended for home use, but the invention may also be employed for connecting the ends of other broad cinematograph films. Such a broad film may be made in one or more parts.

According to the present invention the perforations adjacent to the ends of the broad film or films to be joined are threaded onto pins, so that the pictures adjacent to the ends properly register with each other. The overlapping ends of the film or films are then punched to produce a hole near to each side of the film or films, which holes are of suitable diameter to receive and accurately fit separated headed transverse members. The separate transverse members are passed through the holes in one layer of film and the other layer of film is threaded onto the said separate transverse members. The transverse members are then detachably fixed in position, securely connecting the overlapping ends of the film or films and holding the pictures in correct register. This method of connecting the ends of a film or films enables the ends to be readily disconnected so that a large number of films may be stored flat in a small space or they may be rolled up.

In order to allow the transverse members to pass readily over the driving sprocket, the cylindrical part of this latter may be grooved to receive such members. If a sprocket shield is employed to keep the film in engagement with the sprocket teeth, part of the shield is cut away to allow the fastening means to pass freely.

The leading edge of the continuous film, that is to say the edge which is in contact with the cylindrical part of the sprocket is cut with a concave curve, thus allowing the edges of the film to pass onto the sprockets before the center of the film comes in contact with the cylindrical part of the sprocket or with the guides.

By this means any tendency of the film to catch on the said cylindrical part of the sprocket or on the guides or against any adjacent surfaces is obviated. The transverse members may consist of press-buttons, small nuts and bolts, paper binders or other like narrow apparatus which will retain the two parts of the film in contact, which can be readily connected and disconnected in a dark room, and which is sufficiently flat and small to pass over the sprocket. One part of such connecting apparatus may be permanently fixed to one end of the film as by cement.

One transverse member is in front of all the pictures and the other is behind them, consequently they do not pass through the gate.

The invention is illustrated in the accompanying drawings, in which:—

Figure 1:
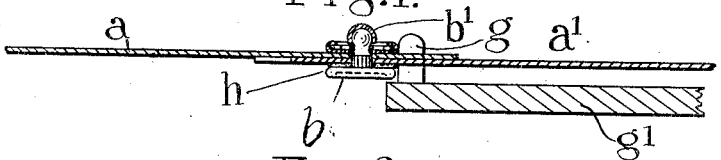
Figure 1 is a longitudinal section of the ends of a single broad film of the character above specified which may be bent into circular or oval form; or they may be the ends of two separate broad films to be made into circular form.
Figure 2:
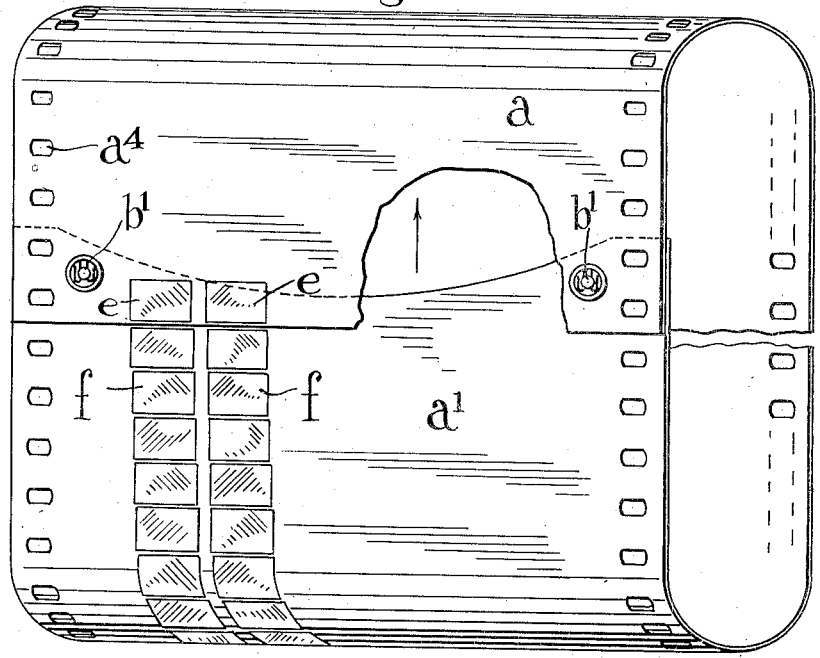
Fig. 2 is a perspective view of the joined ends of a broad film upon which pictures may be taken in helical or parallel lines in known manner.
Figure 5:
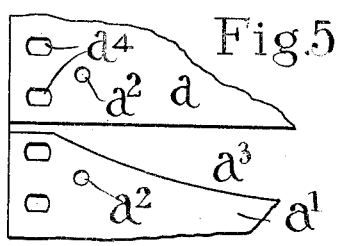
Figs. 5 and 6 are plan views of adjacent parts of a broad film or films.
Figure 6:
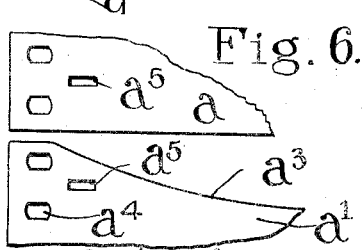

$a$, $a^1$ represent the ends of the broad film or films to be joined. These are placed upon two pins $g$ only one of which is seen, carried by a base $g^1$ and spaced apart to correspond with the perforations $a^4$ in the film. The adjacent pictures $e$, $f$, thus being correctly placed, a perforation $a^2$ is made through the two thicknesses of film, near each side thereof. The ends are then removed from the pins $g$, and one part $b$ of a push button is passed through each pair of perforations $a^2$. This part $b$ should accurately fit the perforations so as to retain the ends in their correct relative positions. The other part $b^1$ of the push button is then snapped onto each part $b$. The lower part $a^1$ of the broad film, is formed with a concave end $a^3$, as shown in Figs. 2, 5 and 6. A layer of cement $h$ may secure the part $b$ to the end $a^1$ of the film.

Figure 3:
Figs. 3 and 4 are longitudinal sections of broad films showing modifications.

Fig. 3 shows a small bolt $c$ and nut $c^1$ employed for connecting the ends $a$, $a^1$ of the film.

Figure 4:

Fig. 4 shows a narrow T-shaped or headed paper binder $d$ employed for the purpose of connecting the ends $a$, $a^1$. When employing a paper binder the perforations in the film are in the form of narrow slots $a^5$ as shown in Fig. 6 to fit the double thickness of metal, and the ends $d^1$ are then turned down onto the film and pressed flat as shown in Fig. 4.

What I claim as my invention is:—

1. An improved continuous broad cinematograph film on which the pictures are arranged longitudinally and laterally thereon, the ends of said film being overlapped and the edge of the under layer having a concave end and separate narrow means for connecting the overlapped ends of the film, one of such means being adjacent to one side of the film and located before all the pictures and the other of such means being adjacent to the other side of the film and behind all the pictures, substantially as set forth.

2. An improved continuous broad cinematograph film on which the pictures are arranged longitudinally and laterally, the ends of said film being overlapped and the edge of the under layer having a concave end, the overlapped parts of the film being perforated near to each edge thereof, separate narrow transverse members passed through the perforations in the film, one of such members being located before all the pictures and the other behind all the pictures and means for securing the separate transverse members in the perforations, substantially as set forth.

3. An improved continuous broad cinematograph film on which the pictures are arranged longitudinally and laterally, the ends of said film being overlapped and the edge of the under layer having a concave end, the overlapped parts of the film being perforated near to each edge thereof, and separate press buttons, one part of each press button being passed through the perforations and the other part of each press button being snapped onto the first mentioned part, one press button being located before all the pictures and the other press button being located behind all the pictures, substantially as set forth.

In witness whereof I have set my hand.

ARTHUR SAMUEL NEWMAN.